Patented Apr. 22, 1952

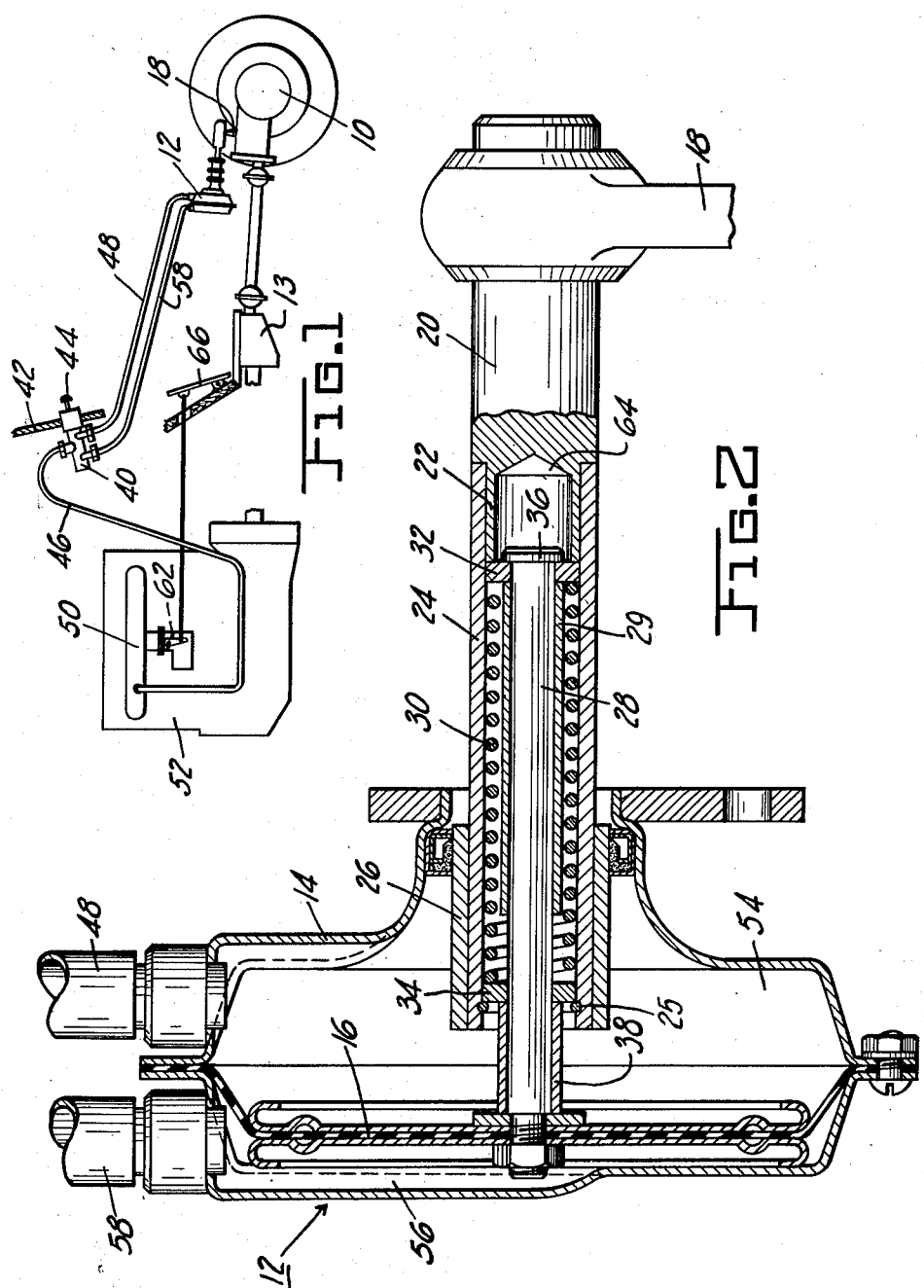

2,593,604

UNITED STATES PATENT OFFICE 2,593,604

TRANSMISSION OPERATING MECHANISM

Earl R. Price, South Bend, Ind., assignor to Bendix Aviation Corporation, South Bend, Ind., a corporation of Delaware Application May 7, 1945, Serial No. 592,447

3 Claims. (Cl. 121—38)

This invention relates in general to gear shifting mechanism and is of particular utility when employed in connection with speed changing and direction-reversing gearing commonly used in coupling the internal combustion engine of an automotive vehicle or a tank with the driving vehicle wheels or other propelling devices.

One object of my invention is to provide power means for operating a two-speed transmission gear mechanism, said mechanism being operably associated with a differential mechanism of standard construction and mounted adjacent thereto in the power plant of the vehicle. In other words, it is an object of my invention to provide power means for operating the so-called two-speed axle mechanism of the day.

Yet another object of my invention is to provide power means for operating a two-speed axle, said power means being controlled by an operation of the accelerator and an operation of a manually operated selector valve.

A further object of my invention is to provide power means for operating a change-speed transmission, such as the conventional selective gear transmission or a conventional two-speed axle mechanism, said power means including a spring and vacuum operated double-acting motor the operation of which is controlled by the operation of a manually operated four-way selector valve and the operation of the accelerator of the vehicle in its control of the speed of the engine and the degree of gaseous pressure within the intake manifold of said engine.

Yet another object of my invention is to provide, in a power plant of an automotive vehicle, power means for moving, to one or the other of two positions, a gear shifting member of a change-speed transmission mechanism said power means including a motor the power element of which is connected to said gear shifting member by force transmitting means, including a yieldable means, having three distinct stages of operation, said power means being controlled by the operation of a manually operated four-way selector valve and the operation of the accelerator of the vehicle in its control of the speed of the engine and the degree of gaseous pressure within the intake manifold of the engine.

One of the important features of my invention is to provide a spring and pressure differential operated motor for establising a change-speed transmission in one or the other of two settings said motor being connected with said transmission by means including a double-acting yieldable means which is energized, that is cocked, during the first half of the gear shifting movement of the power element of said motor, said yieldable means being then operative, after said power element has completed its gear shifting movement to neutralize the transmission, to establish the transmission in gear.

Yet another object of my invention is to provide power means for operating the two-speed axle of an automotive vehicle, said power means including a double-acting spring and vacuum motor comprising a casing member detachably secured to the casing of the two-speed axle and further comprising a power element operably connected to a shift fork or equivalent element of the axle mechanism. The force transmitting means interconnecting the shift fork and power element includes a double-acting yieldable means which is of such a strength that the same is cocked, to make of said means a source of potential energy, when the motor is vacuum energized, said operation being effected prior to the neutralization of the axle mechanism which is effected during the last part of the movement of the power element of said motor, and cocked yieldable means then functioning, after the gears of the axle mechanism to be meshed are brought to synchronous speeds by controlling the speed of the engine of the vehicle, to expand thereby effecting a new setting of the axle mechanism.

One of the most important objects of my invention is to provide, in an automotive vehicle including an internal combustion engine controlled in part by an accelerator operated throttle valve, power means for effecting one or the other of two settings of the change-speed transmission of said vehicle, said power means including a double-acting motor the power element of which is connected to the transmission by force transmitting means operating in three distinct stages to shift the transmission from one setting to the other, the operation of the power means being controlled by an operation of the throttle valve and a manually operated or controlled selector valve.

Other objects of the invention and desirable details of construction will become apparent from the detailed description of certain embodiments of the invention described in the specification to follow and disclosed in the accompanying drawings in which:

Figure 1 is a diagrammatic view disclosing the preferred embodiment of my invention serving to operate a two-speed rear axle of an automotive vehicle; and Figure 2 is a sectional view disclosing the spring and pressure differential operated motor of that embodiment of my invention disclosed in Figure 1.

Referring now to Figure 1 disclosing one embodiment of my invention a rear axle, generally indicated by the reference numeral 10, is of the two-speed type and the change from one axle speed to another is effected by means of a spring and pressure differential operated motor 12 which may be secured in place by any suitable mounting. It is to be understood, however, that my invention is not necessarily limited to means for operating a two-speed axle; for the motor 12 of my invention may also constitute part of the means for operating any multi-speed transmission mechanism, i. e., the conventional three-speeds forward and reverse change gear transmission 13 disclosed in Figure 1. The motor 12 may also be used to operate a two-speed transmission incorporated in the power plant immediately to the rear of the transmission 13.

The motor 12 preferably comprises a two-part double-ended casing 14, Figure 2, and a diaphragm, that is power element 16, the latter being connected to the transmission mechanism by a force transmitting means which operates in three stages and which constitutes an important feature of my invention.

Referring now to Figure 2, a three-stage force transmitting means interconnects the piston 16 and a transmission operating crank 18 said force transmitting means comprising a rod 20 provided with a hollow end portion 22. A tubular member 24 is, at one of its ends, sleeved over and fixedly secured to the aforementioned end portion 22 and at its other end said tubular member 24 is slidably mounted within a bushing 26 having an airtight and tight friction fit within an opening in the casing 14. A locking ring 25, serving as a stop member, is mounted in one end of the member 24. To the center of the power element 16 there is secured one end of a rod 28, said rod being telescoped within the member 24. A spring 30, sleeved over the rod 28 and housed within the member 24, is interposed between thrust members 32 and 34, which members are slidably mounted on the rod 28 and are adapted respectively to abut a flange 36 on the end of the rod 28 and a sleeve 38 mounted on said rod adjacent its connection with the power element 16. The sleeve 38 serves as a force transmitting means operably interconnecting the power element 16 and the thrust member 34; for when said power element is moved to the right, Figure 2, such movement results in the compression of the spring 30. A sleeve 29, telescoped over the rod 28 and positioned between the thrust members 32, 34, serves as a stop member to limit the degree of compression of the spring 30.

It is to be noted here that the above described particular type of force transmitting means is disclosed but not claimed in my co-pending application Serial No. 514,937, filed December 20, 1943, now Patent No. 2,402,343, issued June 18, 1946.

The operation of the spring and pressure differential operated motor 12 is controlled in part by a manually operated four-way, that is double three-way selector valve 40 which is preferably mounted on the instrument panel 42 within the driver's compartment. This four-way valve control 40 is of conventional design; accordingly, it is not disclosed in detail, e. g., such a valve is disclosed in the U. S. Patent to Breese No. 2,179,710, dated November 14, 1939. Suffice it to say that when a manually operated member 44 is pulled outwardly to its high gear position, the valve 40 serves to interconnect a conduit 46 with a conduit 48, the conduit 46 being connected to the intake manifold 50 of the internal combustion engine 52 of the vehicle. The conduit 48 is connected to one end of the motor 12 or in other words said conduit is connected to a compartment 54 of said motor, said compartment being outlined by the power element 16 and one end of the casing of the motor. The remaining compartment 56 of the motor 12 is connected to the control valve 40 by a conduit 58 and when the valve operating member 44 is pushed inwardly to its low gear position, the conduits 46 and 58 are connected, thereby connecting the compartment 56 with the intake manifold; and the conduit 48 and compartment 54 connected therewith are by this operation of the valve vented to the atmosphere. Completing the description of the operation of the selector valve when, as described above, said valve is moved to its higher gear position then the compartment 56 is vented to the atmosphere.

Describing now the operation of the transmission operating mechanism constituting my invention, it will be assumed that the vehicle is in motion with the transmission 10 established in its low gear setting; and with the transmission in this setting the power element 16 is in the position disclosed in Figure 2. To shift the transmission 10 to its high gear or overdrive setting and thereby lower the engine speed, the driver moves the valve operating member 44 to its high gear position whereby the compartment 54 of the motor 12 is connected to the intake manifold. Now as is well known to those skilled in the art the gaseous pressure within the intake manifold is substantially low when the engine throttle 62 is closed and the internal combustion engine is operating; and this gaseous pressure is also below atmosphere pressure, that is the intake manifold is to a degree evacuated when the throttle is partially opened to maintain the car under way.

Now for the purpose of this description it will be assumed that the driver effects the aforementioned high gear setting of the control valve 40 as the car is being driven along a level or substantially level roadway, the transmission being at this time established in low gear. Now when this setting of the control valve is completed the motor 12 will be vacuum energized, the power element 16 moving to the right, Figure 2, to compress the spring 30 solid or substantially solid. In this operation the transmission operating crank 18 and the members 20 and 24 connected thereto remain stationary, the rod 28 moves to the right until the flange 36 is say adjacent but not in contact with an inner end portion 64 of the rod 20, and the power element 16, which is at the time subjected to the pressure of the atmosphere on its left side and to a relatively low gaseous pressure on its right side, moves to a position half way or substantially half way between the end walls of the motor; and this operation of the power means constitutes the first of three stages of operation of the three-stage force transmitting means interconnecting the motor with the transmission.

To effect the second stage of operation of the force transmitting means the driver releases the accelerator 66 thereby idling the engine 52 and reversing its torque as this operation is described by those skilled in the art; and this operation results in the neutralization of the transmission 10 for when the engine torque is reversed it is then possible to demesh the gears of the transmission establishing the same in its low gear setting. With this operation the power element 16, which is at the time subjected to a differential of gaseous pressures, resumes its movement to the right, Figure 2, until it bottoms in the motor, that is, moves into contact with the casing thereof; and all of the force transmitting elements interconnecting the power element 16 with the crank 18 are bodily moved to the right as a unit. The third stage of operation of the force transmitting means, that is, the stage of operation to establish the transmission in its high gear setting, is effected when the speed of the engine is slowed down sufficiently to bring the gears of the transmission to their synchronous speeds. In other words when the gears of the transmission to be meshed are rotating at the same or substantially the same speed, then the spring 30, which is at this time cocked, expands to effect the meshing of said gears to establish the transmission in its high gear setting; and in this third stage operation of the mechanism the power element 16 and rod 23 connected thereto remain stationary and the members 18, 20, 24 and 32 move bodily to the right, Figure 2.

The high gear setting of the transmission having been established, the driver will then depress the accelerator to increase the speed of the engine to either maintain or increase the speed of the vehicle.

To reestablish the low gear setting of the transmission 10 to, say, facilitate the climbing of a hill or to pass a car on the road, the driver will, to effect three stages of operation of the transmission operating mechanism, successively (1) operate the control valve 40 to effect its low gear setting, (2) release the accelerator to reverse the engine torque and (3) depress the accelerator to increase the engine speed and thereby bring the transmission gear to be meshed up to synchronous speed. Now in this operation of the transmission the motor 12 and the above described force transmitting means operate in the same manner as when effecting the above described high gear setting of the transmission; accordingly, said description will not be repeated.

There is thus provided a simple three-stage transmission operating mechanism whereby the operation of said mechanism is controlled by two manually operated members, that is the accelerator and a selector control valve. The double-acting motor, which is vacuum energized to establish the transmission in its low gear setting and vacuum energized to establish the transmission in its high gear setting, cooperates well with the force transmitting means interconnecting the power element of the motor and the transmission to be operated; for said motor and force transmitting means together provide an operation of the transmission in three stages thereby obviating any clashing of the gears and avoiding the subjection of said gears and operating means to undesirable stresses and strains.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the forms hereinbefore described being merely preferred embodiments.

I claim:

1. A pressure differential operated motor unit adapted for use in an automotive transmission operating mechanism including a double ended cylinder member, a power element reciprocable within the cylinder member, a hollow force transmitting member slidably mounted in one end of the cylinder member, a force transmitting rod secured to the central portion of the power element and telescoped within the hollow force transmitting member, force transmitting means, including a spring member, sleeved over and slidably mounted on the rod and serving, when the motor is energized, to transmit a load from the power element to the hollow force transmitting member, together with a sleeve member telescoped over the rod and serving as a stop member to limit the degree of compression of the spring member.

2. A double acting pressure differential operated motor unit adapted for use in an automotive transmission operating mechanism including a double ended cylinder member each end thereof being ported to receive a fluid transmitting conduit, a power element reciprocable within the cylinder member, a hollow force transmitting member slidably mounted in one end of the cylinder member, a rod member hollowed at one of its ends and secured to the force transmitting member, a stop member secured to one end of the force transmitting member, a force transmitting rod secured to the central portion of the power element and telescoped within the hollow force transmitting member, and force transmitting means, including a spring member and a thrust member positioned at each end of the spring member, sleeved over and slidably mounted on the rod and serving, when the motor is energized, to transmit a load from the power element to the hollow force transmitting member, one of said thrust members contacting the stop secured to the end of the force transmitting member and the other of said thrust members being contactable with the hollowed out end of the first mentioned rod member.

3. A double acting pressure differential operated motor unit adapted for use in an automotive transmision operating mechanism including a double ended cylinder member, a power element reciprocable within the cylinder member, a hollow force transmitting member slidably mounted within one end of the cylinder member, a force transmitting rod secured to the central portion of the power element and telescoped within the hollow force transmitting member; force transmitting means, including a spring member and a thrust member positioned at each end of the spring member, sleeved over and slidably mounted on the rod and serving, when the motor is energized, to transmit a load from the power element to the hollow force transmitting member; together with a sleeve member interposed between the power element and one of the thrust members, disconnectedly engaging each of said members and serving, when the power element is moved in one direction, as a force transmitting member operably interconnecting the power element and thrust member.

EARL R. PRICE.

(References on following page)

REFERENCES CITED

The following references are of record in the file of this patent:

UNITED STATES PATENTS

| Number | Name | Date |
|---|---|---|
| 837,416 | Marsh | Dec. 4, 1906 |
| 1,740,818 | Killingsworth | Dec. 24, 1929 |
| 1,870,341 | Maybach | Aug. 9, 1932 |
| 1,883,743 | Maybach | Oct. 18, 1932 |
| 1,949,168 | Maybach | Feb. 27, 1934 |
| 2,101,021 | Daly | Dec. 7, 1937 |
| 2,137,249 | Sanford et al. | Nov. 22, 1938 |
| 2,356,598 | Lang et al. | Aug. 22, 1944 |
| 2,360,976 | Peterson et al. | Oct. 24, 1944 |
| 2,373,259 | Price | Apr. 10, 1945 |
| 2,452,599 | Paulus et al. | Nov. 2, 1948 |

FOREIGN PATENTS

| Number | Country | Date |
|---|---|---|
| 268,312 | Germany | Dec. 12, 1913 |